United States Patent
Sherman et al.

(10) Patent No.: US 10,626,204 B2
(45) Date of Patent: Apr. 21, 2020

(54) OPTICALLY CLEAR HOT MELT PROCESSABLE HIGH REFRACTIVE INDEX ADHESIVES

(71) Applicants: Audrey A. Sherman, Woodbury, MN (US); Margot A. Branigan, Roseville, MN (US); Vijay Rajamani, Minneapolis, MN (US); Thomas E. Augustine, Hager City, WI (US); Michael P. Daniels, Inver Grove Heights, MN (US)

(72) Inventors: Audrey A. Sherman, Woodbury, MN (US); Margot A. Branigan, Roseville, MN (US); Vijay Rajamani, Minneapolis, MN (US); Thomas E. Augustine, Hager City, WI (US); Michael P. Daniels, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/227,470

(22) Filed: Dec. 20, 2018

(65) Prior Publication Data
US 2019/0276576 A1 Sep. 12, 2019

Related U.S. Application Data

(62) Division of application No. 14/654,926, filed as application No. PCT/US2013/076331 on Dec. 19, 2013, now Pat. No. 10,202,477.

(60) Provisional application No. 61/746,643, filed on Dec. 28, 2012.

(51) Int. Cl.
| | |
|---|---|
| C09J 9/00 | (2006.01) |
| C09J 133/08 | (2006.01) |
| C09J 7/38 | (2018.01) |
| C08F 220/18 | (2006.01) |
| C08L 33/08 | (2006.01) |
| C09J 11/06 | (2006.01) |
| B05D 1/26 | (2006.01) |
| B05D 3/02 | (2006.01) |
| B05D 3/06 | (2006.01) |
| C09D 7/40 | (2018.01) |

(52) U.S. Cl.
CPC ............ *C08F 220/18* (2013.01); *B05D 1/265* (2013.01); *B05D 3/0254* (2013.01); *B05D 3/068* (2013.01); *C08L 33/08* (2013.01); *C09D 7/69* (2018.01); *C09J 7/385* (2018.01); *C09J 9/00* (2013.01); *C09J 133/08* (2013.01); *C09J 11/06* (2013.01); *C09J 2433/00* (2013.01); *Y10T 428/254* (2015.01)

(58) Field of Classification Search
None
See application file for complete search history.

(56) References Cited

U.S. PATENT DOCUMENTS

| | | | |
|---|---|---|---|
| 4,719,261 A * | 1/1988 | Bunnelle | A41F 9/02 156/244.11 |
| 4,737,559 A | 4/1988 | Kellen | |
| 5,223,465 A | 6/1993 | Ueki | |
| RE34,605 E | 5/1994 | Schrenk | |
| 5,360,659 A | 11/1994 | Arends | |
| 5,579,162 A | 11/1996 | Bjornard | |
| 5,804,610 A * | 9/1998 | Hamer | B29B 13/022 522/182 |
| 5,882,774 A | 3/1999 | Jonza | |
| 6,049,419 A | 4/2000 | Wheatley | |
| 6,294,249 B1 | 9/2001 | Hamer | |
| 6,663,978 B1 | 12/2003 | Olson | |
| 6,800,680 B2 | 10/2004 | Stark | |
| 6,928,794 B2 | 8/2005 | Hamer | |
| 7,084,209 B2 * | 8/2006 | Everaerts | C08F 293/005 525/272 |
| 7,294,861 B2 | 11/2007 | Schardt | |
| 7,335,425 B2 | 2/2008 | Olson | |
| 8,124,169 B2 | 2/2012 | Ylitalo | |
| 8,742,022 B2 | 6/2014 | Pokorny | |
| 2008/0199704 A1 | 8/2008 | Ho | |
| 2010/0048804 A1 | 2/2010 | Determan | |
| 2012/0270980 A1 | 10/2012 | Pokorny | |

FOREIGN PATENT DOCUMENTS

| | | |
|---|---|---|
| EP | 1244756 | 10/2002 |
| WO | WO 2006-118883 | 11/2006 |
| WO | WO 2014-093141 | 6/2014 |

OTHER PUBLICATIONS

International Search Report for PCT International Application No. PCT/US2013/076331 dated May 13, 2014, 4 pages.
http://www.chemspider.com/Chemical-Structure.10617852.html(2016).

* cited by examiner

*Primary Examiner* — Frank D Ducheneaux
(74) *Attorney, Agent, or Firm* — Jeffrey M. Olofson

(57) ABSTRACT

Adhesive compositions that are optically transparent include a (meth)acrylate-based copolymer having a refractive index of at least 1.48, and particles of a thermoplastic polymer. At least some of the particles have an average particle size that is larger than the wavelength of visible light. The adhesive compositions are prepared by hot melt processing packaged adhesive compositions.

9 Claims, No Drawings

OPTICALLY CLEAR HOT MELT PROCESSABLE HIGH REFRACTIVE INDEX ADHESIVES

CROSS-REFERENCE TO RELATED APPLICATIONS

The current application is a divisional of U.S. Ser. No. 14/654926, filed Dec. 19, 2013, which is now issued as U.S. Pat. No. 10,202,477, issued Feb. 12, 2019; which claims priority to U.S. Provisional No. 61/746643, filed Dec. 28, 2012.

FIELD OF THE DISCLOSURE

The present disclosure relates generally to adhesives, specifically to adhesives that are optically clear, hot melt processable and that have a high refractive index.

BACKGROUND

Adhesives have been used for a variety of marking, holding, protecting, sealing and masking purposes. Adhesive tapes generally comprise a backing, or substrate, and an adhesive. One type of adhesive, a pressure-sensitive-adhesive (PSA) is particularly preferred for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth) acrylate (e.g., acrylate and methacrylate) copolymers. With the exception of several (meth)acrylates, which are inherently tacky, these polymers are typically blended with appropriate tackifying resins to render them pressure-sensitive.

Among the advances that have been made in the adhesive area are adhesive that are prepared in packages or pouches, and adhesives with high refractive indices. Adhesives have been prepared in packages and pouches as described for example in U.S. Pat. Nos. 6,294,249 and 6,928,794 (Hamer et al.). Additionally, pressure sensitive adhesives with high refractive indices are described in U.S. Pat. No. 7,335,425 (Olson et al.).

SUMMARY

Disclosed herein are adhesive compositions, packaged adhesive compositions, articles and methods of preparing articles. Adhesive compositions of this disclosure are optically transparent and comprise a (meth)acrylate-based copolymer having a refractive index of at least 1.48, and particles of a thermoplastic polymer. At least some of the particles have an average particle size that is larger than the wavelength of visible light.

Also disclosed are packaged adhesive compositions comprising a polymerized pre-adhesive mixture, wherein the polymerizable pre-adhesive composition and a packaging material. The polymerizable pre-adhesive composition comprises an aromatic monomer in an amount of at least 5 parts per 100 parts of total monomer, the aromatic monomer having the formula:

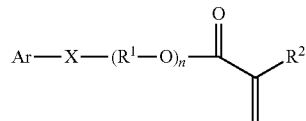

wherein Ar is an aromatic group which is unsubstituted or substituted with a substituent selected from the group consisting of $Br_y$ and $(R^3)_z$ wherein y represents the number of bromine substituents attached to the aromatic group and is an integer from 0 to 3, $R^3$ is a straight or branched alkyl of 2 to 12 carbons, and z represents the number of $R^3$ substituents attached to the aromatic ring and is an integer from 0 to 1, provided that both y and z are not zero, X is oxygen, sulfur or $-NR^4-$, wherein $R^4$ is H or $C_1$-$C_4$ alkyl, n is 0 to 3, $R^1$ is an unsubstituted straight or branched alkyl linking group of 2 to 12 carbons, and $R^2$ is either H or $CH_3$.

Also disclosed are articles comprising a substrate and an adhesive disposed on at least a portion of the substrate. The adhesive comprises a (meth)acrylate-based copolymer having a refractive index of at least 1.48, particles of a thermoplastic polymer, at least some of the particles having an average particle size that is larger than the wavelength of visible light, wherein the adhesive composition is optically transparent.

Also disclosed are methods of preparing adhesive articles comprising providing a hot melt processable packaged adhesive composition, hot melt processing the packaged adhesive composition, and disposing the hot melt processed packaged adhesive composition on a substrate. The packaged adhesives are described above. Providing a hot melt processable packaged adhesive composition comprises combining a polymerizable pre-adhesive reactive mixture and a packaging material to form a packaged pre-adhesive composition, and polymerizing the pre-adhesive mixture. The polymerizable pre-adhesive composition is described above. Polymerization of the packaged pre-adhesive composition can be effected by activation of an initiator present in the pre-adhesive composition, or by exposure to gamma radiation.

DETAILED DESCRIPTION

The use of adhesives, especially pressure sensitive adhesives, in areas such as the medical, electronic, automotive, and optical industries is increasing. The requirements of these industries place additional demands upon the pressure sensitive adhesive beyond the traditional properties of tack, peel adhesion and shear strength. New classes of materials are desirable to meet the increasingly demanding performance requirements for pressure sensitive adhesives. Among the performance requirements for new classes of pressure sensitive adhesives are optical properties such as being optically transparent or optically clear.

Many classes of pressure sensitive adhesive have been prepared to address the increased need for performance issues. Often these pressure sensitive adhesives are provided as solutions or solvent-borne mixtures, often solutions or solvent-borne mixtures containing large amounts of solvents. Upon coating or dispensing, the solvent needs to be removed to produce an adhesive layer. Often the solvent is removed through the use of elevated temperature processing such as heating with an oven. Such solvent removal steps can add cost to the formed articles because solvent removal requires additional steps. Not only are additional steps involved, often these steps require specialized care, precautions and equipment because the solvents are volatile and generally flammable. In addition, shipment of adhesive solutions adds additional expense because of the added weight of solvent and may require special shipment precautions due to the presence of solvent. Environmental concerns are also an issue with solvent borne adhesive systems, since, even with the use of solvent reclamation equipment, solvent release to the environment is likely.

Therefore, 100% solids adhesive systems have been developed. Among these 100% solids systems are hot melt processable adhesives, including hot melt processable pressure sensitive adhesives. Difficulties have arisen when solvent processing has been replaced by hot melt processing. Often it is difficult to replicate the properties of solvent delivered adhesive layers with hot melt delivered systems.

Additionally, because 100% solids pressure sensitive adhesives are tacky polymeric compositions, handling of these compositions, especially on a large scale can be problematic. A wide variety of techniques have been developed to deal with these handling issues. One such technique is the preparation of pressure sensitive adhesive polymers or compositions within a polymeric pouch. These pouches can then be handled without contacting the tacky polymeric composition. The entire pouch can then be hot melt processed, for example in an extruder or similar mixing device, and coated to form a pressure sensitive adhesive layer. This layer contains not only the pressure sensitive adhesive polymer or composition, but also the remnants of the pouch material. Often the remnants of the pouch material comprise polymeric particles. In systems where the pressure sensitive adhesive is not visible (such as with many tape constructions) or where the pressure sensitive adhesive need not have optical properties, the presence of polymeric particles is typically not an issue. However, if the particles are large enough to scatter visible light, that is to say larger than the wavelengths of light associated with the visible portion of the spectrum, and the polymeric particles are of a different refractive index than the pressure sensitive adhesive polymer or composition, the adhesive layer can scatter visible light. This scattering has the detrimental result of decreased visible light transmission and increased haze. The need for adhesive layers with increasingly demanding optical properties, such as high visible light transmission and low haze, makes the desirable process of preparing of pressure sensitive adhesive polymers or compositions within a polymeric pouch and then hot melt processing and coating these pouches to form an adhesive layer, appear to be unlikely to succeed.

Disclosed herein are adhesive compositions and techniques developed to permit the use of the desirable preparation of pressure sensitive adhesive polymers or compositions within a polymeric pouch and then hot melt processing and coating these pouches to form an adhesive layer to produce adhesive layers with desirable optical properties, such as high visible light transmission and/or low haze. These pressure sensitive adhesive compositions comprise (meth)acrylate-based polymers with a relatively high refractive index. These relatively high refractive polymers are higher than conventional (meth)acrylate-based polymers used in pressure sensitive adhesives, and are designed to be similar to the refractive index of the polymers used in the pouch materials. Thus, even if the remnants of the pouches are present as particles that are larger than the wavelength of visible light, the limitation of the mismatch of refractive indices between the (meth)acrylate based polymer and the pouch remnant particles permits the generation of adhesive layers with desirable optical properties, such as high visible light transmission and/or low haze.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "glass transition temperature" and "$T_g$" are used interchangeably. Typically $T_g$ values are measure using Differential Scanning Calorimetry (DSC) unless otherwise noted.

The term "room temperature" refers to ambient temperature, generally 20-22° C., unless otherwise noted.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance over at least a portion of the visible light spectrum (about 400 to about 700 nm).

Unless otherwise indicated, "optically clear" refers to an adhesive or article that has a high light transmittance over at least a portion of the visible light spectrum (about 400 to about 700 nm), and that exhibits low haze.

The term "wavelength of visible light" as used herein encompasses the wavelengths of the light spectrum that constitutes visible light (about 400 to about 700 nm).

Refractive index is defined herein as the absolute refractive index of a material (e.g., a monomer or the polymerized product thereof) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The terms "free radically polymerizable" and "ethylenically unsaturated" are used interchangeably and refer to a reactive group which contains a carbon-carbon double bond which is able to be polymerized via a free radical polymerization mechanism.

Disclosed herein are adhesive compositions that are optically transparent and comprise a (meth)acrylate-based copolymer having a refractive index of at least 1.48, particles of a thermoplastic polymer, at least some of the particles having an average particle size that is larger than the wavelength of visible light. The adhesive composition may also contain other optional additives. These optically transparent compositions typically have a visible light transmission of greater than 85%. In some embodiments that optically transparent compositions have a visible light transmission of greater than 90%. In addition, these optically transparent compositions typically have a haze value of less than 10%, and in some embodiments less than 5%.

In some embodiments of this disclosure, the adhesive composition is optically clear. Optically clear compositions generally have visible light transmission of greater than 90%, and a haze of less than 5%. In some embodiments, the optically clear compositions may have a visible light transmission of greater than 95% and/or a haze value of less than 2%.

Visible light transmission and haze can be measured using well understood optical techniques. For example, visible light transmission and haze can be measured with a BYK Gardner Spectrophotometer using the techniques described in the test method ASTM D1003. The optical properties of the adhesive composition, such as whether the adhesive composition is optically transparent or optically clear, can depend on wide variety of parameters. Among these parameters are: the composition of the (meth)acrylate-based polymer; the composition of the particles; the presence or absence of optional additives; the processing conditions used to prepare the adhesive composition; and so forth. The desired optically properties can be different for different applications and intended uses, and thus, a variety of different adhesive compositions with different optical properties can be suitable. For example, for some applications, optically transparent adhesive compositions are suitable, whereas for other applications, optically clear adhesive compositions are necessary.

The (meth)acrylate-based copolymer having a refractive index of at least 1.48 is prepared from a variety of (meth)acrylate monomers, and may also contain other free radically polymerizable monomers. In some embodiments, the refractive index of the (meth)acrylate-based copolymer is at least 1.50. The refractive index of the (meth)acrylate-based copolymer is one of the parameters used to control the final properties of the adhesive compositions of this disclosure and therefore a variety of refractive indices of at least 1.48 are included in this disclosure.

At least one of the monomers in the (meth)acrylate-based copolymer is an aromatic monomer with a relatively high refractive index. Typically the aromatic monomer has a homopolymer glass transition temperature ($T_g$) at or below 70° C., or even at or below 50° C. In this disclosure, the (meth)acrylate-based copolymer typically comprises at least one aromatic monomer in an amount of at least 5 parts by weight per 100 parts by weight of total monomer. In some embodiments, the (meth)acrylate-based copolymer typically comprises at least one aromatic monomer in an amount of at least 10 parts by weight per 100 parts by weight of total monomer, at least 15 parts by weight per 100 parts by weight of total monomer, at least 20 parts by weight per 100 parts by weight of total monomer, at least 25 parts by weight per 100 parts by weight of total monomer, or even at least 30 parts by weight per 100 parts by weight of total monomer. Because these monomers tend to be more expensive than typical (meth)acrylate monomers and because they typically have a higher $T_g$ than typical (meth)acrylate monomers used in preparing adhesives such as pressure sensitive adhesives, it is often desirable to limit the amount of aromatic monomer present in the (meth)acrylate-based polymer.

The level of aromatic monomer and the identity of the particular aromatic monomer or monomers used depends at least in part upon the desired properties of the (meth)acrylate-based copolymer. Because the aromatic monomers tend to have higher homopolymer glass transition temperatures than conventional (meth)acrylate monomers used in the preparation of adhesive polymers, some care should be exercized in the choice and amount of aromatic monomers used in the preparation of the (meth)acrylate-based copolymer. If the (meth)acrylate-based copolymer is to have pressure sensitive adhesive properties, typically pressure sensitive adhesive copolymers have a glass transition temperature of 20° C. or less, more typically 0° C. or less. If however, the (meth)acrylate-based copolymer is to have heat activated adhesive properties, the copolymers can have a higher glass transition temperature.

Examples of suitable aromatic monomers include those described in U.S. Pat. No. 7,335,425 (Olson et al.) and can be described by the general Formula 1 below:

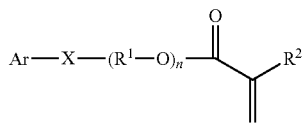

Formula I wherein
Ar is an aromatic group which is unsubstituted or substituted with a substituent selected from the group consisting of $Br_y$ and $(R^3)_z$, wherein y represents the number of bromine substituents attached to the aromatic group and is an integer from 0 to 3, and $R^3$ is a straight or branched alkyl of 2 to 12 carbons, and z represents the number of $R^3$ substituents attached to the aromatic ring and is an integer from 0 to 1, provided that both y and z are not zero;
X is oxygen, sulfur or —$NR^4$—, wherein $R^4$ is H or a $C_1$-$C_4$ alkyl; n is 0 to 3;
$R^1$ is an unsubstituted straight or branched alkyl linking group of 2 to 12 carbons;
and $R^2$ is either H or $CH_3$.

In some embodiments of aromatic monomers, X is oxygen. Within this embodiment
of aromatic monomers, a group of monomers includes those of Formula 2 wherein Ar is naphthyl:

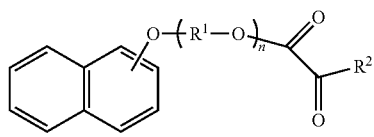

Formula 2 and $R^1$, $R^2$, and n are as defined above. The naphthyl group is unsubstituted or substituted as described above. Within the group of naphthyl aromatic monomers, another group are those wherein Ar is 1-napthyl or 2-napthyl.

Within the embodiment of aromatic monomers where X is oxygen, another group of monomers includes those of Formula 3 wherein Ar is phenyl:

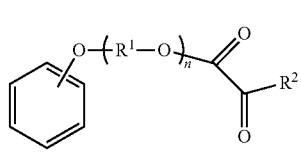

Formula 3 and $R^1$, $R^2$, and n are as defined above. The phenyl group is unsubstituted or substituted as described above. Within the substituted group of phenyl aromatic monomers, generally the phenyl is dibromo substituted. Within the bromine substituted group, the phenyl monomers may also be 2-alkyl substituted or 4-alkyl substituted.

In other embodiments of aromatic monomers, X is sulfur. Within this embodiment of aromatic monomers, a group of monomers includes those of Formula 4 wherein Ar is naphthyl:

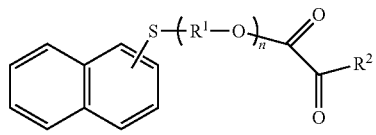

Formula 4 and $R^1$, $R^2$, and n are as defined above. The naphthyl group is unsubstituted or substituted as described above. Within the group of naphthyl aromatic monomers, an additional group is that wherein Ar is 1-napthyl or 2-napthyl.

Within the embodiment of aromatic monomers where X is sulfur, another group of monomers includes those of Formula 5 wherein Ar is phenyl:

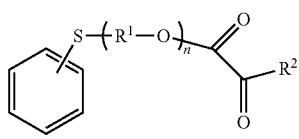

Formula 5 and $R^1$, $R^2$, and n are as defined above. The phenyl group is unsubstituted or substituted as described above. Within this group of phenyl aromatic monomers, generally the phenyl is dibromo substituted. In another group, the phenyl monomers may be 2-alkyl substituted or 4-alkyl substituted.

Some specific examples of such aromatic monomers suitable in the present disclosure include, but are not limited to, 6-(4,6-dibromo-2-isopropyl phenoxy)-1-hexyl acrylate, 6-(4,6-dibromo-2-sec-butyl phenoxy)-1-hexyl acrylate, 2,6-dibromo-4-nonylphenyl acrylate, 2,6-dibromo-4-dodecyl phenyl acrylate, 2-(1-naphthyloxy)-1-ethyl acrylate, 2-(2-naphthyloxy)-1-ethyl acrylate, 6-(1-naphthyloxy)-1-hexyl acrylate, 6-(2-naphthyloxy)-1-hexyl acrylate, 8-(1-naphthyloxy)-1-octyl acrylate, 8-(2-naphthyloxy)-1-octyl acrylate, 2-phenylthio-1-ethyl acrylate, and phenoxy ethyl acrylate.

One particularly suitable class of aromatic monomers are those described in US Patent Publication No. 2010/0048804 (Determan et al.). These aromatic monomers are represented by the general Formula 6 below:

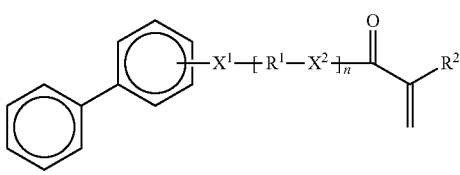

Formula 6 wherein $X^1$ and $X^2$ are each independently —O—, —S—, or —$NR^4$—, wherein $R^4$ is H or $C_1$-$C_4$ alkyl, in some embodiments, $X^1$ and $X^2$ are each —O—;

$R^1$ is an alkylene of 1 to 8 carbons, and may contain one or more ether oxygen atoms and one or more pendent hydroxy groups;

n is integer of from 0 to 3; and $R^2$ is either H or $CH_3$.

In certain embodiments of the aromatic monomer of Formula 6, $R^1$ is an alkylene of 1 to 8 carbons; i.e. —$C_aH_{2a}$—, where a is 1 to 8. In other embodiments $R^1$ may contain one or more catenary ether oxygen atoms; e.g. —$C_bH_{2b}$—O—$C_cH_{2c}$—, where b and c are at least 1 and b+c is 2 to 8. In another embodiment $R^1$ may contain a pendent hydroxy group; e.g. —$C_bH_{2b}$—CH(OH)—$C_cH_{2c}$—, where b and c are at least 1 and b+c is 2 to 8. If desired, the biphenyl group may be brominated to increase the refractive index of the resulting adhesive. However such bromine substitution may also increase the Tg of the adhesive. The biphenyl ring may have zero to two bromine atoms, and are typically substituted ortho- and/or para- to the $X^1$ group. Particularly desirable biphenyl monomers are those that have homopolymer glass transition temperatures at or below 70° C.

A wide variety of co-monomers can be used together with the aromatic monomers described above to generate the desired (meth)acrylate-based copolymer. These co-monomers include alkyl (meth)acrylate monomers, polar (meth)acrylate and ethylenically unsaturated monomers, and other ethylenically unsaturated monomers.

Useful alkyl (meth)acrylate monomers may be present at ranges up to 95 parts by weight per 100 parts by weight total monomer. More typically the alkyl (meth)acrylate are present at a level of 70-95 parts by weight per 100 parts by weight total monomers. Useful monomers include at least one monomer selected from the group consisting of a monomeric acrylic or methacrylic acid ester of a non-tertiary alkyl alcohol, the alkyl group of which comprises from about 1 to about 12 carbon atoms, more typically from about 4 to about 8 carbon atoms, and mixtures thereof.

Suitable alkyl (meth)acrylate monomers include, but are not limited to, those selected from the group consisting of the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like, and mixtures thereof. Such monomeric acrylic or methacrylic esters are known in the art and are commercially available.

Additionally, the (meth)acrylate-based copolymer may also contain copolymerizable polar monomers. Polar monomers can be used to increase the cohesive strength of the adhesive. Generally, polar monomers are typically present at ranges from about 0 to about 12 parts by weight per 100 parts by weight total monomer, more typically from about 2 to about 8 parts by weight per 100 parts by weight total monomer. Useful polar monomers include, but are not limited to, those selected from the group consisting of ethylenically unsaturated carboxylic acids, ethylenically unsaturated sulfonic acids, and ethylenically unsaturated phosphoric acids, and mixtures thereof. Examples of such compounds include, but are not limited to, those selected from the group consisting of acrylic acid, methacrylic acid, itaconic acid, fumaric acid, crotonic acid, citraconic acid, maleic acid, B-carboxyethyl acrylate, sulfoethyl methacrylate, and the like, and mixtures thereof.

Other useful copolymerizable polar monomers include, but are not limited to, acrylamides, N,N-dialkyl substituted acrylamides, N-vinyl lactams, and N,N-dialkylaminoalkyl acrylates, and mixtures thereof. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, and the like, and mixtures thereof.

Particularly useful polar monomers include acrylic acid, methacrylic acid, itaconic acid, acrylamide, methacrylamide, acrylonitrile, methacrylonitrile, and mixtures thereof.

Other ethylenically unsaturated monomers, such as vinyl monomers, may be added to improve performance, reduce cost, etc. in quantities which do not adversely affect the desired optical or adhesive properties of the adhesive. When used, vinyl monomers useful in the adhesive copolymer include vinyl esters (e.g., vinyl acetate and vinyl propionate), styrene, substituted styrene (e.g., α-methyl styrene), and mixtures thereof. If used, such vinyl monomers are generally used at 0 to 5 parts by weight, more typically 1 to 5 parts by weight, based on 100 parts by weight total monomer.

In order to increase cohesive strength of the (meth)acrylate-based copolymer, it may be crosslinked. Because the (meth)acrylate-based copolymer is typically hot melt processed, crosslinking is generally carried out after hot melt processing with crosslinking agents that are not affected by hot melt processing. Typically, such crosslinkers are used in amounts of about 0.05 to 1.0 parts by weight of crosslinker per 100 parts by weight of total monomers present in the (meth)acrylate-based copolymer.

Typically, the crosslinker is a chemical crosslinker that generates free radicals to affect the crosslinking reaction. One suitable class of chemical crosslinkers is a photosensitive crosslinker which is activated by high intensity ultraviolet (UV) light. Two common photosensitive crosslinkers used for (meth)acrylate-based copolymers are benzophenone and copolymerizable aromatic ketone monomers as described in U.S. Pat. No. 4,737,559. Another photocrosslinker, which can be blended with the (meth)acrylate-based copolymer and activated by UV light is a triazine, for example, 2,4-bis(trichloromethyl)-6-(4-methoxy-phenyl)-s-triazine. These crosslinkers are activated by UV light generated from artificial sources such as medium pressure mercury lamps or a UV blacklight.

Additionally, crosslinking can be effected on (meth)acrylate-based copolymers after hot melt processing without the addition or presence of a crosslinking agent through the exposure of the polymer to high energy electromagnetic radiation such as gamma radiation or by exposure to an e-beam (electron beam).

Alternatively, crosslinking can be effected through thermally reversible physical crosslinks that result, for example, from the formation of reinforcing domains due to phase separation of hard segments (i.e., those having a Tg higher than room temperature, preferably higher than 70° C.) and/or acid/base interactions (i.e., those involving functional groups within the same polymer or between polymers or between a polymer and an additive).

The adhesive composition also comprises particles of a thermoplastic polymer, at least some of the particles having an average particle size that is larger than the wavelength of visible light. As will be discussed in greater detail below, the particles are the remnant of pouches prepared from thermoplastic films and hot melt processing.

Suitable thermoplastic materials include polyethylene, and ethylene copolymers such as ethylene/polyolefin copolymers and ethylene/vinyl copolymers such as ethylene vinyl acetate (EVA), ethylene methyl acrylate (EMA), ethylene acrylic acid (EAA), EAA ionomers, and polypropylene, and other thermoplastic materials such as acrylics, polyphenylene ether, polyphenylene sulfide, acrylonitrile-butadiene-styrene copolymer (ABS), polyurethanes, and others know to those skilled in the art. Blends of thermoplastic materials may also be used. Particularly suitable thermoplastic materials are polyethylene and EVA.

The particles may be of a wide range of sizes and shapes, as long as at least some particles have an average particle size that is larger than the wavelength of visible light. Because the particles are formed from the hot melt processing of a pouches that have been prepared from films, the sizes, shapes, as well as the range of sizes and shapes can be largely dependent upon the hot melt processing conditions. This will be discussed in greater detail below.

In some embodiments, at least some of the particles are relatively large. The particles can have a variety of shapes, but typically they are longer in one dimension and narrower in the other two dimensions, roughly needle-shaped. In some embodiments, the particles may be 1 micrometer or even longer in the longest dimension. In some embodiments, the particles may be up to 5 micrometers in the longest dimension. Various techniques can be used to determine the dimensions of the particles such as electron microscopy or optical microscopy. As shown in the Examples section below, optical microscopy was used to determine particle size.

The adhesive composition may also include a variety of optional additives as long as the additives do not interfere with the desired optical and adhesive properties of the adhesive composition. Examples of suitable additives include tackifiers, plasticizers, and other performance enhancement additives. Additionally, for optical applications, tackifiers, plasticizers and other additives should have low color; i.e. a Gardner value of greater than 3, more typically greater than 1.

Examples of useful tackifiers include, but are not limited to, rosin, rosin derivatives, polyterpene resins, coumarone-indene resins, and the like. Plasticizers which may be added to the adhesive may be selected from a wide variety of commercially available materials.

Representative plasticizers include polyoxyethylene aryl ether, dialkyl adipate, 2-ethylhexyl diphenyl phosphate, t-butylphenyl diphenyl phosphate, di-(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. When used, tackifiers are preferably added in an amount not to exceed about 50 parts by weight per 100 parts by weight copolymer, and plasticizer may be added in an amount up to about 50 parts by weight per 100 parts by weight copolymer.

It is desirable that any added tackifier and/or plasticizer has a refractive index of at least 1.50, so that incorporation does not reduce the refractive index of the adhesive. Useful high refractive index plasticizers include aromatic phosphate esters, phtalates, benzoic ethers, aromatic sulfonamide, and some rosins. The phosphate esters and phtalates are preferred. Exemplary plasticizer include diethylene glycol dibenzoate (1.5424 n25/D), 4-(tert-butyl)phenyl diphenyl phosphate (1.555 n25/D), trimethylphenyl phosphate (1.5545 n25/D), triphenyl phosphate (1.5575 n25/D), phenylmethyl benzoate (1.56 n25/D), diethylene glycol dibenzoate (1.5424 n25/D), butyl benzyl phthalate (1.537 n25/D), methyl ester of rosin (1.531 n20/D), alkyl benzyl phthalate (1.526 n25/D), butyl(phenylsulfonyl)amine (1.525 n20/D), benzyl phthalate (1.518 n25/D), trimethyl trimellitate (1.523 (n20/D), and 2-ethylhexyl diphenyl phosphate (1.51 (n20/D).

Other additives can be added in order to enhance the performance of the adhesive compositions. Examples of such performance enhancing additives include leveling agents, ultraviolet light absorbers, hindered amine light stabilizers (HALS), oxygen inhibitors, wetting agents, rheology modifiers, defoamers, biocides, dyes, pigments, and the like. All of these additives and the use thereof are well known in the art. It is understood that any of these compounds can be used so long as they do not deleteriously affect the adhesive and optical properties.

Among the particularly useful additives are UV absorbers and hindered amine light stabilizers (HALS). UV absorbers and hindered amine light stabilizers act to diminish the harmful effects of UV radiation on the adhesive composition and thereby enhance the weatherability, or resistance to cracking, yellowing and delamination of coatings prepared from the adhesive compositions. A suitable HALS is bis(1,2,2,6,6-pentamethyl-4-piperidinyl) [3,5-bis(1,1-dimethylethyl -4-hydroxyphenyl)methyl]butylpropanedioate, available as TINUVIN 144, from CIBA-GEIGY Corporation, Hawthorne, N.Y.

The following UV absorbers and combinations thereof in concentrations of less than 5 parts by weight based on the total monomer composition, may produce desirable results, with concentrations in the range of 1-5 parts by weight based on the total monomer composition being particularly suitable: bis(1,2,2,6,6-pentamethyl-4-piperidinyl)(3,5-bis(1,1-dimethylethyl 1-4-hydroxyphenyl)methyl) butylpropanedioate, 2-ethylhexyl-2-cyano-3,3'-diphenylacrylate, 2-hydroxyl-4-n-octoxybenzophenone, 2-(2'-hydroxy-5'-methylphenyl)benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and UVINUL D-50 and UVINUL MS-40, sold by BASF Wyandotte Inc., Parsippany, N.J.

Additionally, the adhesive composition may also contain particles, as long as the particles do not interfere with the desired optical properties of the adhesive composition. These particles are deliberately added, and are not those resulting from the hot melt processing of the pouch material. Particularly suitable are particles that do not scatter visible light but absorb light of one wavelength and re-emit the light at a different wavelength. Examples of such particles include the phosphor particles described in U.S. Pat. No. 7,294,861 (Schardt et al.).

Also disclosed herein are packaged adhesive compositions comprising an adhesive composition and a packaging material. The adhesive composition comprises a polymerized pre-adhesive mixture comprising a (meth)acrylate-based copolymer with a refractive index of at least 1.48. The adhesive composition may also comprise a variety of different additives.

The adhesive composition is prepared by polymerizing a polymerizable pre-adhesive mixture. The polymerizable pre-adhesive mixture comprises an aromatic monomer having a relatively high refractive index and may also include a mixture of free radically polymerizable comonomers, and a polymerization initiator.

Examples of suitable aromatic monomers include those described in U.S. Pat. No. 7,335,425 (Olson et al.) that have been described above and can be described by the general Formula 1 below:

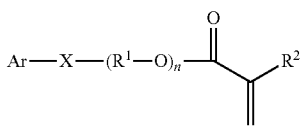

Formula I wherein
Ar is an aromatic group which is unsubstituted or substituted with a substituent selected from the group consisting of $Br_y$ and $(R^3)_z$, wherein y represents the number of bromine substituents attached to the aromatic group and is an integer from 0 to 3, and $R^3$ is a straight or branched alkyl of 2 to 12 carbons, and z represents the number of $R^3$ substituents attached to the aromatic ring and is an integer from 0 to 1, provided that both y and z are not zero;
X is oxygen, sulfur or —$NR^4$—, wherein $R^4$ is H or a $C_1$-$C_4$ alkyl; n is 0 to 3;
$R^1$ is an unsubstituted straight or branched alkyl linking group of 2 to 12 carbons;
and $R^2$ is either H or $CH_3$.

One particularly suitable class of aromatic monomers are those described in US Patent Publication No. 2010/0048804 (Determan et al.). These aromatic monomers have been described above and are represented by the general Formula 6 below:

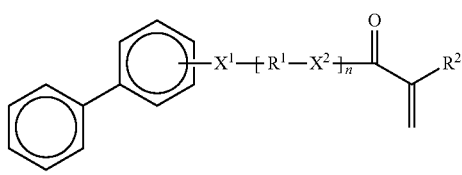

Formula 6 wherein
$X^1$ and $X^2$ are each independently —O—, —S—, or —$NR^4$—, wherein $R^4$ is H or $C_1$-$C_4$ alkyl, in some embodiments, $X^1$ and $X^2$ are each —O—;
$R^1$ is an alkylene of 1 to 8 carbons, and may contain one or more ether oxygen atoms and one or more pendent hydroxy groups;
n is integer of from 0 to 3; and
$R^2$ is either H or $CH_3$.

In this disclosure, the pre-adhesive mixture typically comprises at least one aromatic monomer in an amount of at least 5 parts by weight per 100 parts by weight of total monomers. In some embodiments, the pre-adhesive mixture comprises at least one aromatic monomer in an amount of at least 10 parts by weight per 100 parts by weight of total monomer, at least 15 parts by weight per 100 parts by weight of total monomer, at least 20 parts by weight per 100 parts by weight of total monomer, at least 25 parts by weight per 100 parts by weight of total monomer, or even at least 30 parts by weight per 100 parts by weight of total monomer. Because these monomers tend to be more expensive than typical (meth)acrylate monomers and because they typically have a higher $T_g$ than typical (meth)acrylate monomers used in preparing adhesives such as pressure sensitive adhesives, it is often desirable to limit the amount of aromatic monomer present in the (meth)acrylate-based polymer.

The pre-adhesive mixture may also comprise a wide variety of co-monomers together with the aromatic monomers described above. These co-monomers include alkyl (meth)acrylate monomers, polar (meth)acrylate and ethylenically unsaturated monomers, and other ethylenically unsaturated monomers.

Useful alkyl (meth)acrylate monomers may be present at ranges up to 95 parts by weight per 100 parts by weight total monomer. More typically the alkyl (meth)acrylate are present at a level of 70-95 parts by weight per 100 parts by weight total monomers. Useful monomers include at least one monomer selected from the group consisting of a monomeric acrylic or methacrylic acid ester of a non-tertiary alkyl alcohol, the alkyl group of which comprises from about 1 to about 12 carbon atoms, more typically from about 4 to about 8 carbon atoms, and mixtures thereof.

Suitable alkyl (meth)acrylate monomers include, but are not limited to, those selected from the group consisting of the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like, and mixtures thereof. Such monomeric acrylic or methacrylic esters are known in the art and are commercially available.

Additionally, the pre-adhesive mixture may also contain copolymerizable polar monomers. Polar monomers can be used to increase the cohesive strength of the adhesive. Generally, polar monomers are typically present at ranges from about 0 to about 12 parts by weight per 100 parts by weight total monomer, more typically from about 2 to about 8 parts by weight per 100 parts by weight total monomer. Useful polar monomers include, but are not limited to, those selected from the group consisting of ethylenically unsaturated carboxylic acids, ethylenically unsaturated sulfonic acids, and ethylenically unsaturated phosphoric acids, and mixtures thereof. Examples of such compounds include, but are not limited to, those selected from the group consisting of acrylic acid, methacrylic acid, itaconic acid, fumaric acid, crotonic acid, citraconic acid, maleic acid, B-carboxyethyl acrylate, sulfoethyl methacrylate, and the like, and mixtures thereof.

Other useful copolymerizable polar monomers include, but are not limited to, acrylamides, N,N-dialkyl substituted acrylamides, N-vinyl lactams, and N,N-dialkylaminoalkyl acrylates, and mixtures thereof. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, and the like, and mixtures thereof.

Particularly useful polar monomers include acrylic acid, methacrylic acid, itaconic acid, acrylamide, methacrylamide, acrylonitrile, methacrylonitrile, and mixtures thereof.

Other ethylenically unsaturated monomers, such as vinyl monomers, may be added to improve performance, reduce cost, etc. in quantities which do not adversely affect the desired optical or adhesive properties of the adhesive. When used, vinyl monomers useful in the adhesive copolymer include vinyl esters (e.g., vinyl acetate and vinyl propionate), styrene, substituted styrene (e.g., a-methyl styrene), and mixtures thereof. If used, such vinyl monomers are generally used at 0 to 5 parts by weight, more typically 1 to 5 parts by weight, based on 100 parts by weight total monomer.

Besides the above listed monomers, the pre-adhesive mixture may also comprise optional additional additives such as a crosslinker or a chain transfer agent. In order to increase cohesive strength of the (meth)acrylate-based copolymer, it may be crosslinked. Because the packaged adhesive composition is typically hot melt processed, crosslinking is generally carried out after hot melt processing with crosslinking agents that are not affected by hot melt processing. Therefore, crosslinkers in this context refer to materials that copolymerize with the (meth)acrylate monomers described above, and then are subsequently activated to create crosslinks. In this way, the polymerized packaged adhesive composition is not crosslinked and therefore is hot melt processable, but upon hot melt processing and coating, the adhesive can be crosslinked.

Typically, the crosslinker is a chemical crosslinker that generates free radicals to affect the crosslinking reaction. One suitable class of chemical crosslinkers is a photosensitive crosslinker which is activated by high intensity ultraviolet (UV) light. Two common photosensitive crosslinkers used for (meth)acrylate-based copolymers are benzophenone and copolymerizable aromatic ketone monomers as described in U.S. Pat. No. 4,737,559. Typically, such crosslinkers are used in amounts of about 0.05 to 1.0 parts by weight of crosslinker per 100 parts by weight of total monomers present in the pre-adhesive mixture.

Additionally, a photocrosslinking agent can be blended with the pre-adhesive mixture. This type of photocrosslinker does not polymerize into the (meth)acrylate based copolymer, but remains in the package and is not activated by the hot melt processing. An example of such a photocrosslinker, which can be blended with the (meth)acrylate-based copolymer and activated by UV light, is a triazine, for example, 2,4-bis(trichloromethyl)-6-(4-methoxy-phenyl)-s-triazine. These crosslinkers, whether incorporated into the (meth) acrylate-based copolymer or blended with the copolymer, are activated by UV light generated from artificial sources such as medium pressure mercury lamps or a UV blacklight.

The pre-adhesive mixture may also comprise a chain transfer agent. Examples of useful chain transfer agents include, but are not limited to, those selected from the group consisting of carbon tetrabromide, mercaptans, alcohols, and mixtures thereof.

The pre-adhesive mixture may also comprise an initiator to initiate free radical polymerization. Typically, the initiator is a thermal initiator. Thermal initiators useful in the present disclosure include, but are not limited to azo, peroxide, persulfate, and redox initiators. In some embodiments, it may be desirable not to include an initiator and effect initiation through the use of, for example, gamma radiation. In these embodiments, the packaged pre-adhesive mixture is exposed to gamma radiation as described, for example, in pending application U.S. Ser. No. 61/737,221, filed Dec. 14, 2012.

Suitable azo initiators include, but are not limited to, 2,2'-azobis(2, 4-dimethylvaleronitrile) (VAZO 52); 2,2'-azobisisobutyronitrile) (VAZO 64); 2,2'-azobis-2-methylbutyronitrile (VAZO 67); and (1,1'-azobis(1-cyclohexanecarbonitrile) (VAZO 88), all of which are available from DuPont Chemicals, and 2,2'-azobis(methyl isobutyrate) (V-601) and 2,2'-azobis(2-amidinopropane) dihydrochloride (V-50) available from Wako Chemicals. Also suitable is 2,2'-azobis (4-methoxy-2,4-dimethylvaleronitrile), formerly available from DuPont Chemicals as VAZO 33.

Suitable peroxide initiators include, but are not limited to, benzoyl peroxide, acetyl peroxide, lauroyl peroxide, decanoyl peroxide, dicetyl peroxydicarbonate, di(4-t-butyl-cyclohexyl) peroxydicarbonate (PERKADOX 16S, available from AKZO Chemicals), di(2-ethylhexyl) peroxydicarbonate, t-butylperoxypivalate (LUPERSOL 11, available from Atochem), t-butylperoxy-2-ethylhexanoate (TRIGONOX 21-050, available from Akzo Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfate; systems based on organic peroxides and tertiary amines (for example, benzoyl peroxide plus dimethylaniline); and systems based on organic hydroperoxides and transition metals, for example, cumene hydroperoxide plus cobalt naphthenate.

Other initiators include, but are not limited to pinacols, such as tetraphenyl 1,1,2,2-ethanediol.

The thermal initiator may be used in an amount from about 0.01 to about 5.0 parts by weight per 100 parts of total monomer, more typically from 0.025 to 2 parts by weight per 100 parts of total monomer.

The adhesive composition may also comprise a variety of additives that are not copolymerizable materials such as those described above as long as the additives do not interfere with the desired optical and adhesive properties of the adhesive composition. Crosslinking additives have already been described above. Examples of other suitable additives include tackifiers, plasticizers, and other performance enhancement additives. Additonally, for optical applications, tackifiers, plastizicers and other additives should have low color; i.e. a Gardner value of greater than 3, more typically greater than 1.

Examples of useful tackifiers include, but are not limited to, rosin, rosin derivatives, polyterpene resins, coumarone-indene resins, and the like. Plasticizers which may be added to the adhesive may be selected from a wide variety of commercially available materials.

Representative plasticizers include polyoxyethylene aryl ether, dialkyl adipate, 2-ethylhexyl diphenyl phosphate, t-butylphenyl diphenyl phosphate, di-(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. When used, tackifiers are preferably added in an amount not to exceed about 50 parts by weight per 100 parts by weight copolymer, and plasticizer may be added in an amount up to about 50 parts by weight per 100 parts by weight copolymer.

It is desirable that any added tackifier and/or plasticizer has a refractive index of at least 1.50, so that incorporation does not reduce the refractive index of the adhesive. Useful high refractive index plasticizers include aromatic phosphate esters, phtalates, benzoic ethers, aromatic sulfonamide, and some rosins. The phosphate esters and phtalates are preferred. Exemplary plasticizer include diethylene glycol dibenzoate (1.5424 n25/D), 4-(tert-butyl)phenyl diphenyl phosphate (1.555 n25/D), trimethylphenyl phosphate (1.5545 n25/D), triphenyl phosphate (1.5575 n25/D), phenylmethyl benzoate (1.56 n25/D), diethylene glycol dibenzoate (1.5424 n25/D), butyl benzyl phthalate (1.537 n25/D), methyl ester of rosin (1.531 n20/D), alkyl benzyl phthalate (1.526 n25/D), butyl(phenylsulfonyl)amine (1.525 n20/D), benzyl phthalate (1.518 n25/D), trimethyl trimellitate (1.523 (n20/D), and 2-ethylhexyl diphenyl phosphate (1.51 (n20/D).

Other additives can be added in order to enhance the performance of the adhesive compositions. Examples of such performance enhancing additives include leveling agents, ultraviolet light absorbers, hindered amine light stabilizers (HALS), oxygen inhibitors, wetting agents, rheology modifiers, defoamers, biocides, dyes, pigments, and the like. All of these additives and the use thereof are well known in the art. It is understood that any of these compounds can be used so long as they do not deleteriously affect the adhesive and optical properties.

Among the particularly useful additives are UV absorbers and hindered amine light stabilizers (HALS). UV absorbers and hindered amine light stabilizers act to diminish the harmful effects of UV radiation on the adhesive composition and thereby enhance the weatherability, or resistance to cracking, yellowing and delamination of coatings prepared from the adhesive compositions. A suitable HALS is bis(1,2,2,6,6-pentamethyl-4-piperidinyl) [3,5-bis(1,1-dimethylethyl -4-hydroxyphenyl)methyl]butylpropanedioate, available as TINUVIN 144, from CIBA-GEIGY Corporation, Hawthorne, N.Y.

The following UV absorbers and combinations thereof in concentrations of less than 5 parts by weight based on the total monomer composition, may produce desirable results, with concentrations in the range of 1-5 parts by weight based on the total monomer composition being particularly suitable: bis(1,2,2,6,6-pentamethyl-4-piperidinyl)(3,5-bis(1,1-dimethylethyl 1-4-hydroxyphenyl)methyl) butylpropanedioate, 2-ethylhexyl-2-cyano-3,3'-diphenylacrylate, 2-hydroxyl-4-n-octoxybenzophenone, 2-(2'-hydroxy-5'-methylphenyl)benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and UVINUL D-50 and UVINUL MS-40, sold by BASF Wyandotte Inc., Parsippany, N.J.

Additionally, the adhesive composition may also contain particles, as long as the particles do not interfere with the desired optical properties of the adhesive composition. Particularly suitable are particles that do not scatter visible light but absorb light of one wavelength and re-emit the light at a different wavelength. Examples of such particles include the phosphor particles described in U.S. Pat. No. 7,294,861 (Schardt et al.).

The packaged adhesive composition also comprises a packaging material. The packaging material completely surrounds the polymerized pre-adhesive mixture and any optional additives. The packaging material is a thermoplastic material that generally melts at or below the processing temperature of the polymerized pre-adhesive mixture (in other words, the temperature at which the polymerized pre-adhesive mixture flows). The packaging material generally has a melting point of 200° C. or less, or 170° C. or less. In some embodiments the melting point ranges from 90° C. to 150° C. The packaging material may be a flexible thermoplastic polymeric film. The flexible thermoplastic polymeric films are prepared from thermoplastic materials. Suitable thermoplastic materials include polyethylene, and ethylene copolymers such as ethylene/polyolefin copolymers and ethylene/vinyl copolymers such as ethylene vinyl acetate (EVA), ethylene methyl acrylate (EMA), ethylene acrylic acid (EAA), EAA ionomers, and polypropylene, and other thermoplastic materials such as acrylics, polyphenylene ether, polyphenylene sulfide, acrylonitrile-butadiene-styrene copolymer (ABS), polyurethanes, and others know to those skilled in the art. Blends of thermoplastic materials may also be used. Particularly suitable thermoplastic materials are polyethylene and EVA.

The flexible thermoplastic films range in thickness from 0.01 mm to 0.25 mm. The thicknesses typically range from 0.025 mm to 0.127 mm to obtain films that have good strength during processing while being thin enough to heat seal quickly and minimize the amount of film material used.

The packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive composition.

The amount of packaging material depends upon the type of material and the desired end properties. The amount of packaging material typically ranges from 0.5 to 20 weight % based on the total weight of the adhesive composition and the packaging material. Typically, the packaging material is between 2 and 15 weight %, and more typically between 3 and 5 weight %.

Also disclosed herein are methods of preparing packaged adhesive compositions. These methods are similar to those described in U.S. Pat. No. 6,294,249 (Hamer et al.). In this method, a polymerizable pre-adhesive composition is prepared. The polymerizable pre-adhesive mixture comprises an aromatic monomer having a relatively high refractive index and may also include a mixture of free radically polymerizable comonomers, a polymerization initiator, and optional additives as described above. This mixture can be prepared and mixed in any suitable mixing apparatus.

In some embodiments, two lengths of thermoplastic film are heat sealed together across the bottom and on each of the lateral edges on a liquid form-fill-seal machine to form an open ended pouch. The pre-adhesive composition is pumped through a hose to fill the pouch, and the pouch is then heat sealed across the top to completely surround the adhesive composition.

Generally, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the pre-adhesive composition can alter the packaging material, and it is desirable to cross-seal the pouches within about one minute of filling, more typically within 30 seconds, and most typically within 15 seconds. If the pre-adhesive composition decreases the strength of the packaging material, it is desirable to polymerize the composition as soon as possible after the pre-adhesive composition is surrounded by the packaging material.

Alternatively, a single length of film can be folded lengthwise and sealed on one edge, filled with the pre-adhesive composition, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film. For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

Thermal polymerization can be effected by immersing the packaged composition in a heat exchange medium at temperatures between about 40° C. and 100° C. for a time sufficient to polymerize the composition. The heat exchange medium may be a forced or impinged gas or a liquid such as water, perfluorinated liquids, glycerine, or propylene glycol. The heat necessary for thermal polymerization may also be provided by a metal platen, heated metal rolls, or microwave energy.

The temperature at which the polymerization occurs depends upon the activation temperature of the initiator. It is desirable to carry out the polymerization in an appropriate liquid heat exchange medium at a controlled temperature. A suitable liquid heat exchange medium is water, heated to the desired reaction temperature. Commercially available heat transfer fluids may also be used.

Upon completion of the polymerization, a packaged adhesive composition is generated. This packaged adhesive composition can be used immediately, stored for later use, or shipped to a different location for hot melt processing. Because the viscoelastic adhesive composition is contained within a package, handling and storage is greatly simplified.

Also disclosed herein, are articles comprising a substrate and an adhesive disposed on at least a portion of the substrate. The adhesive comprises a (meth)acrylate-based copolymer having a refractive index of at 1.48, and particles of a thermoplastic polymer, at least some of the particles having an average particle size that is larger than the wavelength of visible light. The adhesive may be optically transparent or optically clear. The adhesives are described in detail above.

A wide variety of substrates are suitable for use in the articles of this disclosure. Because of the desirable optical properties of the adhesive, frequently the substrate is an optical substrate. As used herein, the term "optical substrate" refers to a substrate that can be used to produce an optical effect. The substrate can be rigid, semi-rigid or flexible. The substrate can be any suitable thickness. The optical substrates often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical substrates include, but are not limited to, plates, sheets, the surfaces of optical articles, and films.

Examples of optically clear rigid and semi-rigid substrates include plates, sheets, the surfaces of articles, and the like. The rigid or semi-rigid substrate may be optically clear, optically transparent or non-transparent. Examples of non-transparent substrates include ones that are reflective scattering elements.

Examples of plates include a wide array of optically clear materials. Examples of suitable plates include a variety of glasses or from polymeric materials such as polycarbonate or polymethyl methacrylate. The plates may be in a variety of thickness and may be flat or curved. In some embodiments, the plate may also comprise additional layers or treatments. Examples of additional layers include, for example, additional layers of film designed to provide tinting, shatter resistance and the like. Examples of additional treatments that may be present include, for example, coatings or various types such as hardcoats.

Sheets are similar to plates but generally are thinner and less rigid than plates. Examples of sheets include, for example, optically clear semi-rigid substrates of glass or other optically clear materials that are 25-100 micrometers in thickness.

Examples of substrates that are the surface of an article include, but are not limited to, the outer surface of an electronic display such as liquid crystal display or a cathode ray tube, an electronic device such as a touch screen, an appliance such as a microwave oven (e.g. the time/button display), the outer surface of a window or glazing, the outer surface of an optical component such as a reflector, polarizer, diffraction grating, mirror, or lens, or the like. The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like. The substrate may be a reflective scattering element. Reflective scattering elements are ones that exhibit diffuse or semi-specular reflection. Diffuse and semi-specular reflections involve the reflection of light from a surface such that an incident ray is reflected at many angles rather than at just one angle as in specular reflection. A wide array of materials can be used to prepare reflective scattering elements, such as plaster, paper, fibrous materials such as cloth and non-woven fiber mats, inorganic filled reflective polymers, ceramic materials, crystalline surfaces, and voided polymeric materials. Examples of reflective scattering elements include graphics such as signs, markings or pictures; rough reflective surfaces of metals such as brushed aluminum and chrome; coated surfaces such as painted, printed, or ink-coated surfaces.

Examples of flexible optical substrates include a wide array of optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in pending U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of anti-microbial coatings include those described in U.S. Pat. No. 8,124,169 (Ylitalo et al.) which describe an antimicrobial coating system that includes a film-forming composition and an effective amount of an antimicrobial agent dispersed within the film-forming composition.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

In some embodiments, the optical film comprises a multilayer paint protection film suitable for use with automobiles and other related uses. Examples of suitable films include those described, for example in US Patent Publication No. 2008/0199704 (Ho et al.). These multilayer films contain polyurethanes that are lightly crosslinked but are not thermosets. These multilayer films are typically transparent, and possibly even translucent, for paint protection applications, or even opaque for other surface protection or enhancement applications. For some applications, it may be desirable for the multilayer film to be colored. When used as a paint protection film, it is often desirable for the multilayer film to be sized and shaped to conform to the surface to be protected, before the film is applied. Pre-sized and shaped pieces of the multilayer film can be commercially desirable for protecting the painted surface of various body parts of a vehicle such as, for example, an automobile, aircraft, watercraft, etc., especially those portions of the vehicle body (e.g., the leading edge of the front hood and other leading surfaces, rocker panels, etc.) that are exposed to such hazards as flying debris (e.g., sand, rocks, etc.), insects, or the like.

Particularly suitable articles are those where the substrate comprises a film, a tape backing, a graphic article, a light guide, a plastic article, a wound dressing, a protection film or tape, a light extraction layer, a keypad or membrane switch, a heat shrinkable layer or substrate, a display, a touch sensor, or a moldable film.

Also disclosed herein are methods for preparing adhesive articles comprising providing a hot melt processable packaged adhesive composition, hot melt processing the packaged adhesive composition, and disposing the hot melt processed packaged adhesive composition on a substrate. The adhesive composition comprises a (meth)acrylate-based copolymer having a refractive index of at 1.48, and particles of a thermoplastic polymer, at least some of the particles having an average particle size that is larger than the wavelength of visible light. The adhesive may be optically transparent or optically clear. The adhesives are described in detail above.

Methods of preparing hot melt processable packaged adhesive compositions are described in detail above. These packaged adhesive compositions are hot melt processed through the use of a hot melt mixing apparatus.

A variety of hot melt mixing techniques using a variety of hot melt mixing equipment are suitable for processing the packaged adhesive compositions. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, CN). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to process the packaged adhesive compositions of this disclosure.

The output of the hot melt mixing is coated onto a substrate to form an adhesive layer. If a batch apparatus is used, the resulting hot melt blend can be removed from the apparatus and placed in a hot melt coater or extruder and coated onto a substrate. If an extruder is used to prepare a hot melt blend, the blend can be directly extruded onto a substrate to form an adhesive layer in a continuous forming method. In the continuous forming method, the adhesive can be drawn out of a film die and subsequently contacted to a moving plastic web or other suitable substrate. If the adhesive is to be part of a tape, the substrate may be a tape backing. In some methods, the tape backing material is coextruded with the adhesive from a film die and the multilayer construction is then cooled to form the tape in a single coating step. If the adhesive is to be a transfer tape, the adhesive layer may be a free standing film and the substrate may be a release liner or other releasing substrate. After forming, the adhesive layer or film can be solidified by quenching using both direct methods (e.g. chill rolls or water batch) and indirect methods (e.g. air or gas impingement).

If it is desired to crosslink the pressure sensitive adhesive layer, the adhesive layer can be subjected to a crosslinking process. If a photosensitive crosslinker is present, such as those described above, the adhesive layer can be exposed to high intensity UV lamps to effect crosslinking. If no crosslinker is present, crosslinking may be achieved by exposing the adhesive layer to high-energy electromagnetic radiation such as gamma or e-beam radiation.

The disclosure includes the following embodiments:

Among the embodiments are adhesive compositions. The first embodiment includes an adhesive composition comprising: a (meth)acrylate-based copolymer having a refractive index of at least 1.48; particles of a thermoplastic polymer, at least some of the particles having an average particle size that is larger than the wavelength of visible light, wherein the adhesive composition is optically transparent.

Embodiment 2 is the adhesive composition of embodiment 1, wherein the adhesive composition is optically clear, having a visible light transmission of greater than 90%, and a haze of less than 5%.

Embodiment 3 is the adhesive composition of embodiment 1 or 2, wherein the particles of thermoplastic polymer comprise particles of polyethylene, ethylene vinyl acetate, ethylene methyl acrylate, ethylene acrylic acid, ethylene acrylic acid ionomers, polypropylene, acrylic polymers, polyphenylene ether, polyphenylene sulfide, acrylonitrile-butadiene-styrene copolymers, polyurethanes, and mixtures and blends thereof.

Embodiment 4 is the adhesive composition of any of embodiments 1-3, wherein the particles of thermoplastic polymer comprise particle of polyethylene, ethylene vinyl acetate, or mixtures or blends thereof.

Embodiment 5 is the adhesive composition of any of embodiments 1-4, wherein the (meth)acrylate-based copolymer comprises a copolymer of an aromatic monomer in an amount of at least 5 parts per 100 parts of total monomer, the aromatic monomer having the formula:

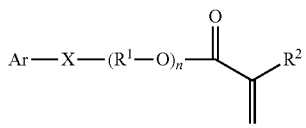

wherein: Ar is an aromatic group which is unsubstituted or substituted with a substituent selected from the group consisting of $Br_y$ and $(R^3)_z$ wherein y represents the number of bromine substituents attached to the aromatic group and is an integer from 0 to 3; $R^3$ is a straight or branched alkyl of 2 to 12 carbons; and z represents the number of $R^3$ substituents attached to the aromatic ring and is an integer from 0 to 1, provided that both y and z are not zero; X is oxygen, sulfur or $—NR^4—$, wherein $R^4$ is H or $C_1$-$C_4$ alkyl; n is 0 to 3; $R^1$ is an unsubstituted straight or branched alkyl linking group of 2 to 12 carbons; and $R^2$ is either H or $CH_3$.

Embodiment 6 is the adhesive composition of any of embodiments 1-5, further comprising at least one acrylic monomer selected from the group consisting of monomeric acrylic or methacrylic acid ester of a non-tertiary alkyl alcohol of about 1 to about 12 carbons.

Embodiment 7 is the adhesive composition of any of embodiments 1-6, further comprising at least one polar monomer copolymerizable with the aromatic monomer(s).

Embodiment 8 is the adhesive composition of embodiment 6, wherein the acrylic monomer is selected from the group consisting of 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and mixtures thereof.

Embodiment 9 is the adhesive composition of embodiment 7, wherein the polar monomer(s) are selected from the group consisting of ethylenically unsaturated carboxylic acids, ethylenically unsaturated sulfonic acids, ethylenically unsaturated phosphoric acids, acrylamides, N,N-dialkyl substituted acrylamides, N-vinyl lactams, and N,N-dialkylaminoalkyl acrylates, ethylenically unsaturated nitriles, and mixtures thereof.

Embodiment 10 is the adhesive composition of embodiment 5, wherein the aromatic monomer(s) are selected from the group consisting of 6-(4,6-dibromo-2-isopropyl phenoxy)-1-hexyl acrylate, 6-(4,6-dibromo-2-sec-butyl phenoxy)-1-hexyl acrylate, 2,6-dibromo-4-nonylphenyl acrylate, 2,6-dibromo-4-dodecyl phenyl acrylate, 2-(1-naphthyloxy)-1-ethyl acrylate, 2-(2-naphthyloxy)-1-ethyl acrylate, 6-(1-naphthyloxy)-1-hexyl acrylate, 6-(2-naphthyloxy)-1-hexyl acrylate, 8-(1-naphthyloxy)-1-octyl acrylate, 8-(2-naphthyloxy)-1-octyl acrylate, and phenoxy ethyl acrylate.

Embodiment 11 is the adhesive composition of any of embodiments 1-10, wherein the adhesive composition is crosslinked.

Among the embodiments are packaged adhesive compositions. Embodiment 12 is a packaged adhesive composition comprising: a polymerized pre-adhesive mixture, wherein the polymerizable pre-adhesive composition comprises: an aromatic monomer in an amount of at least 5 parts per 100 parts of total monomer, the aromatic monomer having the formula:

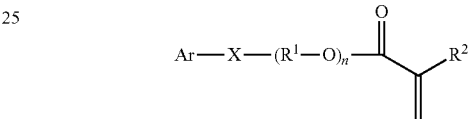

wherein: Ar is an aromatic group which is unsubstituted or substituted with a substituent selected from the group consisting of $Br_y$ and $(R^3)_z$ wherein y represents the number of bromine substituents attached to the aromatic group and is an integer from 0 to 3; $R^3$ is a straight or branched alkyl of 2 to 12 carbons; and z represents the number of $R^3$ substituents attached to the aromatic ring and is an integer from 0 to 1, provided that both y and z are not zero; X is oxygen, sulfur or $—NR^4—$, wherein $R^4$ is H or $C_1$-$C_4$ alkyl; n is 0 to 3; $R^1$ is an unsubstituted straight or branched alkyl linking group of 2 to 12 carbons; and $R^2$ is either H or $CH_3$; and a packaging material.

Embodiment 13 is the packaged adhesive composition of embodiment 12, wherein the packaging material comprises polyethylene, ethylene vinyl acetate, ethylene methyl acrylate, ethylene acrylic acid, ethylene acrylic acid ionomers, polypropylene, acrylic polymers, polyphenylene ether, polyphenylene sulfide, acrylonitrile-butadiene-styrene copolymers, polyurethanes, and mixtures and blends thereof.

Embodiment 14 is the packaged adhesive composition of embodiment 12 or 13, wherein the packaging material comprises polyethylene, ethylene vinyl acetate, or mixtures or blends thereof.

Embodiment 15 is the packaged adhesive composition of any of embodiments 12-14, wherein the polymerizable pre-adhesive mixture further comprises at least one acrylic monomer selected from the group consisting of monomeric acrylic or methacrylic acid ester of a non-tertiary alkyl alcohol of about 1 to about 12 carbons.

Embodiment 16 is the packaged adhesive composition of embodiment 15, wherein the acrylic monomer is selected from the group consisting of 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and mixtures thereof.

Embodiment 17 is the packaged adhesive composition of any of embodiments 12-16, wherein the polymerizable pre-adhesive mixture further comprises at least one polar monomer copolymerizable with the aromatic monomer(s).

Embodiment 18 is the packaged adhesive composition of embodiment 17, wherein the polar monomer(s) are selected from the group consisting of ethylenically unsaturated carboxylic acids, ethylenically unsaturated sulfonic acids, ethylenically unsaturated phosphoric acids, acrylamides, N,N-dialkyl substituted acrylamides, N-vinyl lactams, and N,N-dialkylaminoalkyl acrylates, ethylenically unsaturated nitriles, and mixtures thereof.

Embodiment 19 is the packaged adhesive composition of embodiment 12, wherein the aromatic monomer(s) are selected from the group consisting of 6-(4,6-dibromo-2-isopropyl phenoxy)-1-hexyl acrylate, 6-(4,6-dibromo-2-sec-butyl phenoxy)-1-hexyl acrylate, 2,6-dibromo-4-nonylphenyl acrylate, 2,6-dibromo-4-dodecyl phenyl acrylate, 2-(1-naphthyloxy)-1-ethyl acrylate, 2-(2-naphthyloxy)-1-ethyl acrylate, 6-(1-naphthyloxy)-1-hexyl acrylate, 6-(2-naphthyloxy)-1-hexyl acrylate, 8-(1-naphthyloxy)-1-octyl acrylate, 8-(2-naphthyloxy)-1-octyl acrylate, and phenoxy ethyl acrylate.

Among the embodiments are articles. Embodiment 20 is an article comprising: a substrate; and an adhesive disposed on at least a portion of the substrate, the adhesive comprising: a (meth)acrylate-based copolymer having a refractive index of at least 1.48; particles of a thermoplastic polymer, at least some of the particles having an average particle size that is larger than the wavelength of visible light, wherein the adhesive composition is optically transparent.

Embodiment 21 is the article of embodiment 20, wherein the adhesive composition is optically clear, having a visible light transmission of greater than 90%, and a haze of less than 5%.

Embodiment 22 is the article of embodiment 20 or 21, wherein the substrate comprises a film, a tape backing, a graphic article, a light guide, a plastic article, a wound dressing, a protection film or tape, a light extraction layer, a keypad or membrane switch, a heat shrinkable layer or substrate, a display, a touch sensor, or a moldable film.

Embodiment 23 is the article of any of embodiments 20-22, wherein the particles of thermoplastic polymer comprise particles of polyethylene, ethylene vinyl acetate, ethylene methyl acrylate, ethylene acrylic acid, ethylene acrylic acid ionomers, polypropylene, acrylic polymers, polyphenylene ether, polyphenylene sulfide, acrylonitrile-butadiene-styrene copolymers, polyurethanes, and mixtures and blends thereof.

Embodiment 24 is the article of any of embodiments 20-23, wherein the particles of thermoplastic polymer comprise particle of polyethylene, ethylene vinyl acetate, or mixtures or blends thereof.

Embodiment 25 is the article of any of embodiments 20-24, wherein the (meth)acrylate-based copolymer comprises a copolymer an aromatic monomer in an amount of at least 5 parts per 100 parts of total monomer, the aromatic monomer having the formula:

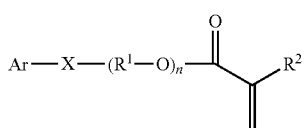

wherein: Ar is an aromatic group which is unsubstituted or substituted with a substituent selected from the group consisting of $Br_y$ and $(R^3)_z$ wherein y represents the number of bromine substituents attached to the aromatic group and is an integer from 0 to 3; $R^3$ is a straight or branched alkyl of 2 to 12 carbons; and z represents the number of $R^3$ substituents attached to the aromatic ring and is an integer from 0 to 1, provided that both y and z are not zero; X is oxygen, sulfur or $-NR^4-$, wherein $R^4$ is H or $C_1$-$C_4$ alkyl; n is 0 to 3; $R^1$ is an unsubstituted straight or branched alkyl linking group of 2 to 12 carbons; and $R^2$ is either H or $CH_3$.

Embodiment 26 is the article of any of embodiments 20-25, wherein the adhesive is crosslinked.

Among the embodiments are methods of preparing an adhesive article. Embodiment 27 is a method of preparing an adhesive article comprising: providing a hot melt processable packaged adhesive composition comprising a hot melt processable (meth)acrylate-based copolymer having a refractive index of at least 1.48, and a packaging material; hot melt processing the packaged adhesive composition; and disposing the hot melt processed packaged adhesive composition on a substrate, wherein the adhesive composition is optically transparent.

Embodiment 28 is the method of embodiment 27, wherein the adhesive composition is optically clear, having a visible light transmission of greater than 90%, and a haze of less than 5%.

Embodiment 29 is the method of embodiment 27 or 28, wherein providing a hot melt processable packaged adhesive composition comprises: combining a polymerizable pre-adhesive reactive mixture and a packaging material to form a packaged pre-adhesive composition, the pre-adhesive mixture comprising an aromatic monomer in an amount of at least 5 parts per 100 parts of total monomer, the aromatic monomer having the formula:

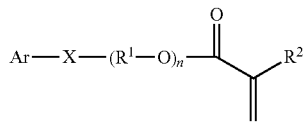

wherein: Ar is an aromatic group which is unsubstituted or substituted with a substituent selected from the group consisting of $Br_y$ and $(R^3)_z$ wherein y represents the number of bromine substituents attached to the aromatic group and is an integer from 0 to 3; $R^3$ is a straight or branched alkyl of 2 to 12 carbons; and z represents the number of $R^3$ substituents attached to the aromatic ring and is an integer from 0 to 1, provided that both y and z are not zero; X is oxygen, sulfur or $-NR^4-$, wherein $R^4$ is H or $C_1$-$C_4$ alkyl; n is 0 to 3; $R^1$ is an unsubstituted straight or branched alkyl linking group of 2 to 12 carbons; and $R^2$ is either H or $CH_3$; and polymerizing the pre-adhesive mixture.

Embodiment 30 is the method of any of embodiments 27-29, wherein the packaging material comprises polyethylene, ethylene vinyl acetate, ethylene methyl acrylate, ethylene acrylic acid, ethylene acrylic acid ionomers, polypropylene, acrylic polymers, polyphenylene ether, polyphenylene sulfide, acrylonitrile-butadiene-styrene copolymers, polyurethanes, and mixtures and blends thereof.

Embodiment 31 is the method of any of embodiments 27-30, wherein the packaging material comprises polyethylene, ethylene vinyl acetate, or mixtures or blends thereof.

Embodiment 32 is the method of embodiment 29, wherein the polymerizable pre-adhesive mixture further comprises at least one acrylic monomer selected from the group consisting of monomeric acrylic or methacrylic acid ester of a non-tertiary alkyl alcohol of about 1 to about 12 carbons.

Embodiment 33 is the method of embodiment 32, wherein the acrylic monomer is selected from the group consisting of 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and mixtures thereof.

Embodiment 34 is the method of embodiment 29, wherein the polymerizable pre-adhesive mixture further comprises at least one polar monomer copolymerizable with the aromatic monomer(s).

Embodiment 35 is the method of embodiment 34, wherein the polar monomer(s) are selected from the group consisting of ethylenically unsaturated carboxylic acids, ethylenically unsaturated sulfonic acids, ethylenically unsaturated phosphoric acids, acrylamides, N,N-dialkyl substituted acrylamides, N-vinyl lactams, and N,N-dialkylaminoalkyl acrylates, ethylenically unsaturated nitriles, and mixtures thereof.

Embodiment 36 is the method of embodiment 29, wherein the aromatic monomer(s) are selected from the group consisting of 6-(4,6-dibromo-2-isopropyl phenoxy)-1-hexyl acrylate, 6-(4,6-dibromo-2-sec-butyl phenoxy)-1-hexyl acrylate, 2,6-dibromo-4-nonylphenyl acrylate, 2,6-dibromo-4-dodecyl phenyl acrylate, 2-(1-naphthyloxy)-1-ethyl acrylate, 2-(2-naphthyloxy)-1-ethyl acrylate, 6-(1-naphthyloxy)-1-hexyl acrylate, 6-(2-naphthyloxy)-1-hexyl acrylate, 8-(1-naphthyloxy)-1-octyl acrylate, 8-(2-naphthyloxy)-1-octyl acrylate, and phenoxy ethyl acrylate.

Embodiment 37 is the method of any of embodiments 27-36, wherein the substrate comprises a film, a tape backing, a graphic article, a light guide, a plastic article, a wound dressing, a protection film or tape, a light extraction layer, a keypad or membrane switch, a heat shrinkable layer or substrate, a display, a touch sensor, or a moldable film.

Embodiment 38 is the method of any of embodiments 27-37, further comprising crosslinking the adhesive disposed on the substrate.

Embodiment 39 is the method of embodiment 38, wherein crosslinking comprises photochemical initiation of a crosslinker, or exposure to gamma radiation or an electron beam.

Embodiment 40 is the method of embodiment 29, wherein polymerization of the pre-adhesive mixture comprises thermal initiation of an initiator, or exposure to gamma radiation.

Embodiment 41 is the method of any of embodiments 27-40, wherein hot melt processing comprises extrusion in an extruder and the resulting disposed adhesive comprises: a (meth)acrylate copolymer having a refractive index of at least 1.48; particles of a thermoplastic polymer, at least some of the particles having an average particle size that is larger than the wavelength of visible light.

Embodiment 42 is the method of embodiment 41, further comprising the addition of at least one additive to the extruder.

Embodiment 43 is the method of any of embodiments 27-42, wherein hot melt processing comprises extrusion in an extruder and disposing the hot melt processed packaged adhesive composition on a substrate comprises simultaneous extrusion of the hot melt processed packaged adhesive composition and the substrate.

EXAMPLES

Optical adhesive formulations were prepared, coated, and tested to show adhesive properties while maintaining acceptable transmission, clarity and haze values. Pouch domain size within the adhesive was also evaluated. These examples are merely for illustrative purposes only and are not meant to be limiting on the scope of the appended claims. All parts, percentages, ratios, etc. in the examples and the rest of the specification are by weight, unless noted otherwise.

Materials:

| Abbreviation | Description |
| --- | --- |
| M1 | Monomer, Isooctyl acrylate, commercially available from CPS Chemical Co., Old Bridge, NJ. |
| M2 | Monomer, Acrylic acid, commercially available from BASF Corporation, Pasippany, NJ |
| M3 | Monomer, 2-biphenyloxyethyl acrylate commercially available from Toagosei Co., Ltd., Tokyo, Japan |
| CTA | Chain Transfer Agent, Isooctylthioglycolate commercially available from Ciba/BASF, Hawthorne, NY |
| PI1 | Photoinitiator, commercially available from Ciba/BASF, Hawthorne, NY as "IRGACURE 651" |
| PI2 | Photoinitiator, commercially available from Ciba/BASF, Hawthorne, NY as "IRGACURE 1076". |
| M4 | Monomer, Acryloxybenzophenone, commercially available from Ciba/BASF, Hawthorne, NY |
| P1 | Polymeric ionic crosslinker as described in U.S. Pat. No. 6,800,680 (Stark) "Basic Copolymer J" except that 2 ethylhexyl acrylate (#290815 available from Sigma Aldrich, St. Louis, MO) was used instead of IOA. |
| P2 | Octene plastomer commercially available from ExxonMobil Chemical, Baytown, TX as "EXACT 8203" |
| M5 | Monomer, N,N-Dimethylacrylamide commercially available from Sigma Aldrich, St. Louis, MO |
| M6 | Monomer, 2-ethylhexyl acrylate commercially available from Sigma Aldrich, St. Louis, MO |

Formulation Table

| Formulation | Components (parts by weight) |
| --- | --- |
| F1 | M1/M2 (94/6) + 0.15 PI 1 + 0.20 PI 2 + 0.15 M4 |
| F2 | M6/M2 (90/10) + 0.03 CTA + 0.15 PI 1 |
| F3 | M1/M2/M3 (89/6/5) + 0.15 PI 1 + 0.20 PI 2 + 0.15 M4 |
| F4 | M1/M2/M3 (84/6/10) + 0.15 PI 1 + 0.20 PI 2 + 0.15 M4 |
| F5 | M1/M2/M3 (74/6/20) + 0.15 PI 1 + 0.20 PI 2 + 0.15 M4 |
| F6 | M1/M2/M3 (72/3/25) + 0.08 CTA |
| F7 | M1/M2/M3 (70/5/25) + 0.03 CTA + 0.15 PI 1 |
| F8 | M1/M2/M3 (65/5/30) + 0.03 CTA + 0.15 PI 1 |
| F9 | M1/M2/M3 (64/6/30) + 0.15 PI 1 + 0.20 PI 2 + 0.15 M4 |
| F10 | M1/M2/M3 (80/5/15) + 0.02 CTA + 0.15 PI 1 + 0.20 PI 2 + 0.15 M4 |
| F11 | M1/M2/M3 (80/5/15) + 0.02 CTA + 0.15 PI 1 + 0.20 PI 2 + 0.15 M4 + 11.15 P2 |
| F12 | M1/M2/M3 (80/5/15) + 0.03 CTA + 0.15 PI 1 + 0.20 PI 2 + 2.00 P1 |
| F13 | M1/M2/M3 (77/6/15) + 0.04 CTA + 0.15 PI 1 + 0.20 PI 2 + 0.15 M4 + 2.00 M5 |

Test Methods
Peel Adhesion (ASTM D3330 PSTC 101)

Peel adhesion is the force required to remove a coated flexible sheet material from a test panel measured at a specific angle and rate of removal. In the examples, the methods of sample preparation and testing are modifications of ASTM method D 3330 (1992) and Pressure Sensitive Tape Council method PSTC-101 (1989). Adhesive extruded onto urethane film was equilibrated under ambient conditions for 1 week. One day prior to testing samples, samples were exposed to a constant temperature and humidity, 23° C. and 50% relative humidity. The samples were cut into 10 millimeter wide strips. Isopropyl alcohol was used to clean RK8014 paint panels (available from ACT, Hillsdale, Mich.) The release liner was removed and the adhesive strips were applied to the RK8014 panels using a squeegee. Peel adhesion was measured about 20 minutes after application as a 180 degree peel back at a crosshead speed of 30 cm/min using Model 1122 tensile tester (available from Modular Test Systems, Shakopee, Minn.). The peel adhesion was measured in ounces per inch and converted to Newtons per meter (N/m).

Total Transmission and Haze (ASTM D1003)

Luminous transmission, clarity and haze were measured according to ASTM D1003-00 using a Gardner Haze-Guard Plus model 4725 (available from BYK-Gardner Columbia, Md.). The adhesive was sandwiched between 2 films (as noted in the Example section) and % transmission, % haze, and % clarity values were recorded.

EXAMPLES

Adhesive Preparation

The adhesive compositions were prepared using the procedures described in U.S. Pat. No. 6,294,249 (Hamer et al.) incorporated herein by reference. Two sheets of ethylene vinyl acetate film, (available from Berry Plastics Corporation, Evansville, Ind.) were heat sealed on the lateral edges and the bottom to form a rectangular pouch measuring 3.175 cm wide on a liquid form, fill, and seal machine, Schlosspack Form Fill Seal Model #VM220HS. The pouch was then filled with the adhesive composition in the solids weight percentages specified in the Formulation Table. The filled package was then heat sealed at the top in the cross direction through the monomer to form individual adhesive pouches measuring 3.175 cm by 3.175 cm by about 0.356 cm thick containing approximately 25 grams of composition.

The adhesive pouches were placed in a water bath that was maintained between about 15° C. and 17° C. and exposed to ultraviolet radiation at an intensity of about 4.5 mW/cm² for 8.33 minutes. The radiation was supplied by lamps having about 90% of the emission between 300 and 400 nm and peak emission at 351 nm.

Examples 1-8 and Comparative Examples C1-C2

Using the formulations and conditions in Table 1, adhesive pouches were fed into a twin screw extruder (Werner Pfleiderer) with barrel temperatures set to 177° C. Adhesives were extruded from a drop die to a thickness of 51 micrometers onto a polyurethane film (prepared as described in example 1 of PCT Publication No. WO 2006/118883 (Ho)). As noted in Table 1 some of the coated adhesives samples were then exposed to ultraviolet radiation. The coated adhesive samples were wound into a roll while inserting a paper web that was treated on both sides with a silicone release coating. The coated adhesives were tested for luminance and peel adhesion using the test methods described above. Results are recorded in Table 1. 165 micrometer PET film with 1.5% haze, 89% transmission, and 99.6% clarity was laminated to the adhesive side of the samples before luminance testing.

TABLE 1

Peel Adhesion, Haze, Transmission and Clarity data for Examples 1-8 and Comparative Examples C1-C2

| Example# | Formulation# | UVC mJ/cm² | % Haze | % Transmission | % Clarity | Peel (N/m) |
| --- | --- | --- | --- | --- | --- | --- |
| E1 | F3 | 0 | 8.9 | 89.4 | 95.3 | 1104 |
| E2 | F3 | 20 | 9.7 | 89.9 | 95.5 | 820 |
| E3 | F4 | 0 | 8.7 | 89.8 | 96.5 | 1063 |

TABLE 1-continued

Peel Adhesion, Haze, Transmission and Clarity data for Examples 1-8 and Comparative Examples C1-C2

| Example# | Formulation# | UVC mJ/cm² | % Haze | % Transmission | % Clarity | Peel (N/m) |
| --- | --- | --- | --- | --- | --- | --- |
| E4 | F5 | 0 | 3.9 | 89.8 | 98.1 | 1222 |
| E5 | F9 | 0 | 2.6 | 89.9 | 98.7 | 1000 |
| E6 | F11 | 0 | 4.2 | 90.0 | 99.6 | 1015 |
| E7 | F12 | 0 | 6.2 | 89.7 | 97.5 | 720 |
| E8 | F13 | 0 | 4.3 | 89.8 | 98.0 | 1244 |
| Comparative Example C1 | F1 | 0 | 16.4 | 88.9 | 93.8 | 1087 |
| Comparative Example C2 | F1 | 20 | 14.9 | 88.9 | 93.8 | 887 |

Example 9

Using the formulation and conditions in Table 2, adhesive pouches were fed into a twin screw extruder (Werner Pfleiderer) with barrel temperatures set to 177° C. Polyurethane pellets (ESTANE ALR CL87AV available from Lubrizol Corporation, Wickliffe, Ohio) were fed into a single screw extruder (Haake) with barrel temperatures set to 177° C. The 2 melt streams were fed into a multi-layer die and extruded onto a paper web that was treated on both sides with a silicone release coating. Intralayer bubbles were observed in the extruded sample. The polyurethane was 152 micrometers thick and the adhesive sample was 51 micrometers thick. The coated adhesive sample was then exposed to ultraviolet radiation. The adhesive was tested for luminance and peel adhesion using the test methods described above. Results are recorded in Table 2. 165 micrometer PET film with 1.5% haze, 89% transmission, and 99.6% clarity was laminated to the adhesive side of the samples before luminance testing.

TABLE 2

Peel Adhesion, Haze, Transmission and Clarity data for Example 9

| Example# | Formulation# | UVC mJ/cm² | % Haze | % Transmission | % Clarity | Peel (N/m) |
| --- | --- | --- | --- | --- | --- | --- |
| E9 | F10 | 30 | 10.1 | 89.8 | 94.9 | 395 |

Example 10-12 and Comparative Example 3

Using the formulation and conditions in Table 3, adhesive pouches were processed through a ram extruder into a static mixer both set to 177° C. The adhesives were extruded from a drop die set at 188° C. The adhesive was extruded onto a paper web that was treated on both sides with a silicone release coating. See the formulations and conditions in Table 3. The adhesive samples were then exposed to ultraviolet or gamma radiation. The ultraviolet radiation was supplied by medium pressure mercury vapor lamps having an output of about 80 watts per cm and spectral output over a range of 180 to 430 nm to provide a total energy of ~250 mJ/cm². The adhesives were tested for luminance using the test method described above. Results are recorded in Table 3. 51 micrometer primed PET film (HOSTAPHAN available from Mitsubishi Polyester Film Inc., Greer, S.C.) with 4.9% haze, 90.7% transmission, and 95.9% clarity was laminated to both sides of the adhesive samples before luminance testing.

TABLE 3

Haze, Transmission and Clarity data for
Examples 10-12 and Comparative Example C3

| Example# | Formulation# | Polymerization Method & Energy | Thickness (micrometers) | % Haze | % Transmission | % Clarity |
|---|---|---|---|---|---|---|
| Comparative Example C3 | F2 | UV 250 (mJ/cm$^2$) | 109.5 | 38.1 | 86.8 | 88.1 |
| E10 | F6 | Gamma 5.8 (kGy) | 89.7 | 4.9 | 87.5 | 97.9 |
| E11 | F7 | UV 250 (mJ/cm$^2$) | 97.3 | 6.4 | 87.6 | 99.0 |
| E12 | F8 | UV 250 (mJ/cm$^2$) | 233.2 | 4.7 | 86.5 | 96.5 |

Micrographs to Determine Phase Size

An approximate 51 mm by 51 mm sample of adhesive only, Formulation 10, Example 9, was cut and placed onto a glass slide under a Zeiss microscope available from System Eickhost, Hamburg, Germany. Micrographs were taken at a magnification of 78.75 times. Using IMAGEJ 1.44K software, available by National Institute of Health, the height and width of the extruded pouch material were measured and averaged to determine the materials domain size within the adhesive.

Results from measuring 2015 extruded pouch domains were averaged. The average height was 0.9194 micrometers and the average width was 0.3138 micrometers.

What is claimed is:

1. A method of preparing an adhesive article comprising:
   providing a hot melt processable packaged adhesive composition comprising a hot melt processable (meth) acrylate-based copolymer having a refractive index of at least 1.48, and
   a packaging material;
   hot melt processing the packaged adhesive composition; and
   disposing the hot melt processed packaged adhesive composition on a substrate, wherein the adhesive is optically transparent, and wherein the refractive index of the (meth)acrylate-based copolymer and the packaging material are matched.

2. The method of claim 1, wherein providing a hot melt processable packaged adhesive composition comprises:
   combining a polymerizable pre-adhesive reactive mixture and a packaging material to form a packaged pre-adhesive composition, the polymerizable pre-adhesive reactive mixture comprising an
   aromatic monomer in an amount of at least 5 parts per 100 parts of total monomer, the aromatic monomer having the formula:

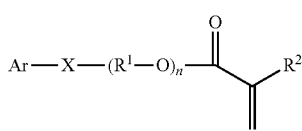

wherein:
   Ar is an aromatic group which is an unsubstituted phenyl group, a substituted or unsubstituted fused or linked aromatic group, or a -substituted phenyl group substituted with a substituent selected from the group consisting of $Br_y$ and $(R^3)_z$ wherein y represents the number of bromine substituents attached to the aromatic group and is an integer from 0 to 3; $R^3$ is a straight or branched alkyl of 2 to 12 carbons; and z represents the number of $R^3$ substituents attached to the aromatic ring and is an integer from 0 to 1, provided that both y and z are not zero;
   X is oxygen, sulfur or $-NR^4-$, wherein $R^4$ is H or $C_1$-$C_4$ alkyl;
   n is 0 to 3;
   $R^1$ is an unsubstituted straight or branched alkyl linking group of 2 to 12 carbons; and
   $R^2$ is either H or $CH_3$;
   polymerizing the polymerizable pre-adhesive reactive mixture.

3. The method of claim 2, wherein the polymerizable pre-adhesive reactive mixture further comprises at least one acrylic monomer selected from the group consisting of monomeric acrylic or methacrylic acid ester of a non-tertiary alkyl alcohol of about 1 to about 12 carbons.

4. The method of claim 2, wherein polymerization of the polymerizable pre-adhesive reactive mixture comprises thermal initiation of an initiator, or exposure to gamma radiation.

5. The method of claim 1, wherein the packaging material comprises polyethylene, ethylene vinyl acetate, ethylene methyl acrylate, ethylene acrylic acid, ethylene acrylic acid ionomers, polypropylene, acrylic polymers, polyphenylene ether, polyphenylene sulfide, acrylonitrile-butadiene-styrene copolymers, polyurethanes, and mixtures and blends thereof.

6. The method of claim 1, further comprising crosslinking the hot melt processed packaged adhesive composition disposed on the substrate.

7. The method of claim 6, wherein crosslinking comprises photochemical initiation of a photosensitive crosslinker, or exposure to gamma radiation or an electron beam.

8. The method of claim 1, wherein hot melt processing comprises extrusion in an extruder and the resulting disposed hot melt processed packaged adhesive composition comprises:
   the (meth)acrylate-based copolymer having a refractive index of at least 1.48; and
   particles of a thermoplastic polymer from the packaging material, at least some of the
   particles having an average particle size that is larger than the wavelength of visible light.

9. The method of claim 1, wherein hot melt processing comprises extrusion in an extruder, and disposing the hot melt processed packaged adhesive composition on a substrate comprises simultaneous extrusion of the hot melt processed packaged adhesive composition and the substrate.

* * * * *